United States Patent
Hester et al.

(10) Patent No.: US 9,718,180 B2
(45) Date of Patent: Aug. 1, 2017

(54) POWER TOOL HAVING IMPROVED MOTOR AND CONTROLLER COOLING

(71) Applicant: BLACK & DECKER INC., Newark, DE (US)

(72) Inventors: Russell D. Hester, Odenton, MD (US); William F. Gallagher, Stewartstown, PA (US); Matthew Miller, Seven Valleys, PA (US)

(73) Assignee: Black & Decker Inc., New Britain, CT (US)

( * ) Notice: Subject to any disclaimer, the term of this patent is extended or adjusted under 35 U.S.C. 154(b) by 460 days.

(21) Appl. No.: 14/271,728

(22) Filed: May 7, 2014

(65) Prior Publication Data

US 2014/0338948 A1  Nov. 20, 2014

Related U.S. Application Data

(60) Provisional application No. 61/821,484, filed on May 9, 2013.

(51) Int. Cl.
| | |
|---|---|
| *B25F 5/00* | (2006.01) |
| *H02K 9/06* | (2006.01) |
| *B25F 5/02* | (2006.01) |
| *H02K 7/14* | (2006.01) |

(52) U.S. Cl.
CPC ............ *B25F 5/008* (2013.01); *B25F 5/02* (2013.01); *H02K 7/145* (2013.01); *H02K 9/06* (2013.01)

(58) Field of Classification Search
CPC .................................. B25F 5/00; B23B 45/02

USPC .... 173/48, 117, 217, 216, 170, 171; 310/47, 310/50

See application file for complete search history.

(56) References Cited

U.S. PATENT DOCUMENTS

| | | | | |
|---|---|---|---|---|
| 2,349,401 | A | * | 5/1944 | Beckwith .............. B23B 45/008 173/170 |
| 3,531,702 | A | * | 9/1970 | Hill ........................ H02K 29/10 318/400.4 |
| 4,100,383 | A | | 7/1978 | Piber |
| 4,222,090 | A | | 9/1980 | Jaffe |
| 4,937,705 | A | | 6/1990 | Piber |
| 6,262,481 | B1 | | 7/2001 | Wang |

(Continued)

FOREIGN PATENT DOCUMENTS

| | | |
|---|---|---|
| DE | 10261572 A1 | 7/2004 |
| DE | 102005007545 A1 | 8/2006 |

(Continued)

*Primary Examiner* — Nathaniel Chukwurah
(74) *Attorney, Agent, or Firm* — Amir R. Rohani

(57) ABSTRACT

A power tool includes a motor housing defining a first air chamber with a first air inlet that receives a motor. A handle extending from the motor housing defines a second air chamber with a second air inlet that receives an electronics control module. A third air chamber with an air outlet receives a fan coupled to the motor output shaft. The fan: (a) pulls a first ambient airstream through the first air chamber from the first air inlet and into the third air chamber, bypassing the second air chamber, to cool the motor; (b) pulls a second ambient airstream through the second air chamber from the second air inlet and into the third air chamber, bypassing the first air chamber, to cool the electronics module; and (c) exhausts the first and second airstreams from the third air chamber via the air outlet.

18 Claims, 15 Drawing Sheets

(56) References Cited

U.S. PATENT DOCUMENTS

| | | | |
|---|---|---|---|
| 6,552,904 | B2 | 4/2003 | Fung |
| 6,615,910 | B1 | 9/2003 | Joshi et al. |
| 6,866,105 | B2 | 3/2005 | Pfisterer et al. |
| 7,258,173 | B2 | 8/2007 | Hammerstingl et al. |
| 7,474,529 | B2 | 1/2009 | Tian et al. |
| 7,523,843 | B2 | 4/2009 | Shew et al. |
| 7,715,197 | B2 | 5/2010 | Tian et al. |
| 7,770,660 | B2 | 8/2010 | Schroeder et al. |
| 7,969,116 | B2 | 6/2011 | Aradachi et al. |
| 2002/0131238 | A1 | 9/2002 | Fisher et al. |
| 2004/0020671 | A1* | 2/2004 | Lamprecht ......... B23Q 11/0046 173/217 |
| 2004/0263008 | A1* | 12/2004 | Voigt ..................... B25F 5/008 310/58 |
| 2005/0202310 | A1* | 9/2005 | Yahnker .................. B25F 5/008 429/62 |
| 2008/0069652 | A1 | 3/2008 | Kobayashi |
| 2008/0179078 | A1* | 7/2008 | Opsitos .............. H05K 7/20509 174/252 |
| 2008/0265695 | A1* | 10/2008 | Yoshida .................... H02K 5/20 310/50 |
| 2008/0290745 | A1* | 11/2008 | Riedl ...................... B25F 5/008 310/50 |
| 2009/0145621 | A1* | 6/2009 | Lau ......................... B25F 5/008 173/217 |
| 2009/0245958 | A1 | 10/2009 | Lau et al. |
| 2011/0162862 | A1* | 7/2011 | Suzuki .................... B25F 5/00 173/217 |
| 2011/0180286 | A1* | 7/2011 | Oomori ................... B25F 5/008 173/20 |
| 2012/0014065 | A1 | 1/2012 | Haga et al. |
| 2012/0234657 | A1 | 9/2012 | Nishikimi et al. |

FOREIGN PATENT DOCUMENTS

| | | |
|---|---|---|
| DE | 102005007546 A1 | 8/2006 |
| DE | 102006015664 A1 | 1/2007 |
| DE | 102006038756 A1 | 2/2008 |
| DE | 102007000290 A1 | 11/2008 |
| DE | 102008060703 A1 | 6/2009 |
| DE | 102009015422 A1 | 10/2009 |
| DE | 102011077850 A1 | 12/2012 |
| EP | 1398865 A2 | 3/2004 |
| EP | 2296848 | 3/2011 |
| EP | 2371202 A2 | 10/2011 |
| EP | 2404708 A2 | 1/2012 |

* cited by examiner

POWER TOOL HAVING IMPROVED MOTOR AND CONTROLLER COOLING

CROSS REFERENCE TO RELATED APPLICATIONS

This application claims priority, under 35 U.S.C. §119(e), to U.S. Provisional Patent Application No. 61/821,484, filed May 9, 2013, which is hereby incorporated by reference.

TECHNICAL FIELD

The present invention relates to a power tool, and specifically to cooling a motor and an electronics control module in a power tool.

BACKGROUND

The use of power tools, especially cordless power tools, has increased dramatically in recent years. Cordless power tools provide the ease of a power assisted tool with the convenience of cordless operation. Conventionally, cordless power tools have been driven by permanent magnet (PM) brushed motors that receive DC power from a battery assembly or converted AC power. In other cordless power tools, a brushless DC motor is used, which achieves commutation electronically by controlling the flow of current to the stator windings. Other types of motors used in power tools include AC motors and universal (AC/DC) motors. Power delivery to motors is generally controlled by various types of electronics control modules.

Motors and electronics control modules in a power tool generate a considerable amount of heat. A fan is typically coupled to the output shaft of the motor to cool the motor and electronics control module. Air inlets and outlets are provided in various parts of the power tool housing to help direct cooling air through or over the motor and electronics control module, and out of the air outlets. The present invention improves on the existing cooling designs in power tools to more efficiently cool the motor and the electronics control module.

SUMMARY

In an aspect, a power tool includes a housing having a first housing portion defining a first air chamber and a first air inlet, a second housing portion defining a second air chamber and a second air inlet, and a third housing portion defining a third air chamber and an air outlet. A motor is disposed in the first housing portion. An electronics module is disposed in the second housing portion and is electrically connected to the motor, a power source, and a user input to control operation of the motor. A tool output shaft is driven by the motor to perform a working operation. A fan is disposed in the third housing portion and is driven by the motor. The fan: (a) pulls a first ambient airstream through the first air chamber from the first air inlet and into the third air chamber, bypassing the second air chamber, to cool the motor, (b) pulls a second ambient airstream through the second air chamber from the second air inlet and into the third air chamber, bypassing the first air chamber, to cool the electronics module, and (c) exhausts the first ambient airstream and the second ambient airstream from the third air chamber via the air outlet.

Implementations of this aspect may include one or more of the following features. The first air chamber may be at least partially defined by an outer wall of the first housing portion, and in internal wall separating the first air chamber from the second air chamber. The internal wall may define a valve that opens when pressure in the second air chamber exceeds pressure in the first air chamber by a predetermined threshold amount, to allow the fan to pull the second ambient airstream through the first air chamber into the third air chamber to cool the motor. The third air chamber may be at least partially defined by a motor cap coupled to a front end of the motor and containing the fan. The motor cap may define a first cap inlet in communication with the first air chamber, a second cap inlet in communication with the second air chamber, and a cap outlet in communication with the air outlet. The motor cap may include a generally cylindrical body having a radial wall facing the motor and defining the first cap inlet, and a generally cylindrical sidewall facing the second air chamber and defining the second cap inlet and the cap outlet.

The first housing portion may include a rear portion of a motor housing. The second housing portion may include a handle extending transverse to the motor housing. The third housing portion may include a front portion of the motor housing. An internal wall may separate the first housing portion from the second housing portion. The second air chamber may be at least partially defined by a converging channel formed in the handle that converges from a wider dimension adjacent the second air inlet and a narrower dimension adjacent the third air chamber. The electronics module may be coupled to a heat sink received in the second air chamber. The heat sink may include a folded metal plate. The handle may have a front portion facing a front end of the power tool, a rear portion facing a rear end of the power tool, and two lateral side portions joining the front portion and the rear portion. The third air chamber may be at least partially defined by a converging channel formed only in one of the lateral side portions and receiving the heat sink.

In another aspect, a power tool includes a motor housing defining a first air chamber with a first air inlet. A handle, coupled to and extending from the motor housing, defines a second air chamber with a second air inlet away from the motor housing. The motor housing also defines a third air chamber with an air outlet. A motor is disposed in the first air chamber. An electronics module is disposed in the second air chamber and is electrically connected to the motor, a power source, and a user input to control operation of the motor. A tool output shaft is driven by the motor to perform a working operation. A fan is disposed in the third air chamber and is driven by the motor. The fan: (a) pulls a first ambient airstream through the first air chamber from the first air inlet and into the third air chamber, bypassing the second air chamber, to cool the motor, (b) pulls a second ambient airstream through the second air chamber from the second air inlet and into the third air chamber, bypassing the first air chamber, to cool the electronics module, and (c) exhausts the first ambient airstream and the second ambient airstream from the third air chamber via the air outlet.

Implementations of this aspect may include one or more of the following features. An internal wall may separate the first air chamber from the second air chamber. The internal wall may define a valve that opens when pressure in the second air chamber exceeds pressure in the first air chamber by a predetermined threshold amount, to allow the fan to pull the second ambient airstream through the first air chamber into the third air chamber to cool the motor. The third air chamber may be at least partially defined by a motor cap coupled to a front end of the motor and containing the fan. The motor cap may define a first cap inlet in communication with the first air chamber, a second cap inlet in communication with the second air chamber, and a cap outlet in communication with the air outlet. The motor cap may include a generally cylindrical body having a radial wall facing the motor and defining the first cap inlet, and a generally cylindrical sidewall facing the second air chamber and defining the second cap inlet and the cap outlet.

The second air chamber may be at least partially defined by a converging channel formed in the handle that converges from a wider dimension adjacent the second air inlet and a narrower dimension adjacent the third air chamber. The electronics module may be coupled to a folded metal heat sink received the second air chamber. The handle may have a front portion facing a front end of the power tool, a rear portion facing a rear end of the power tool, and two lateral side portions joining the front portion and the rear portion. The third air chamber may be at least partially defined by a converging channel formed only in one of the lateral side portions and receiving the heat sink.

In yet another aspect, a power tool includes a motor housing defining an air outlet, and a handle coupled to and extending from the motor housing. The handle defines an air chamber with an air inlet away from the motor housing. A motor is disposed in the motor housing. An electronics module is disposed in the handle and electrically connected to the motor, a power source, and a user input to control operation of the motor. A heat sink is coupled to the electronics module and disposed in the handle. A tool output shaft is driven by the motor to perform a working operation. A fan is disposed in the motor housing and driven by the motor. The fan pulls ambient air through the air chamber from the air inlet, and out of the air outlet, to cool the electronics module. The handle has a front portion facing a front end of the power tool, a rear portion facing a rear end of the power tool, and two lateral side portions joining the front portion and the rear portion. The air chamber is at least partially defined by a converging channel formed only in one of the lateral side portions of the handle, and which receives the heat sink.

Advantages may include one or more of the following. The air chambers are designed to that separate streams of ambient air cool the motor and the electronics module, which leads to more effective cooling of both. The valve can be designed to enable cooling of the motor using the airstream that cools the electronics module if the user blocks the air inlets that are ordinarily used to control the motor. The design of the converging channel and the folded heat sink leads to more effective cooling of the electronics module. Molding the converging channel into one of the lateral sides of the handle enables the handle to have a narrower width dimension. These and other advantages and features will be apparent from the description, the drawings, and the claims.

DETAILED DESCRIPTION

Figure 1A:
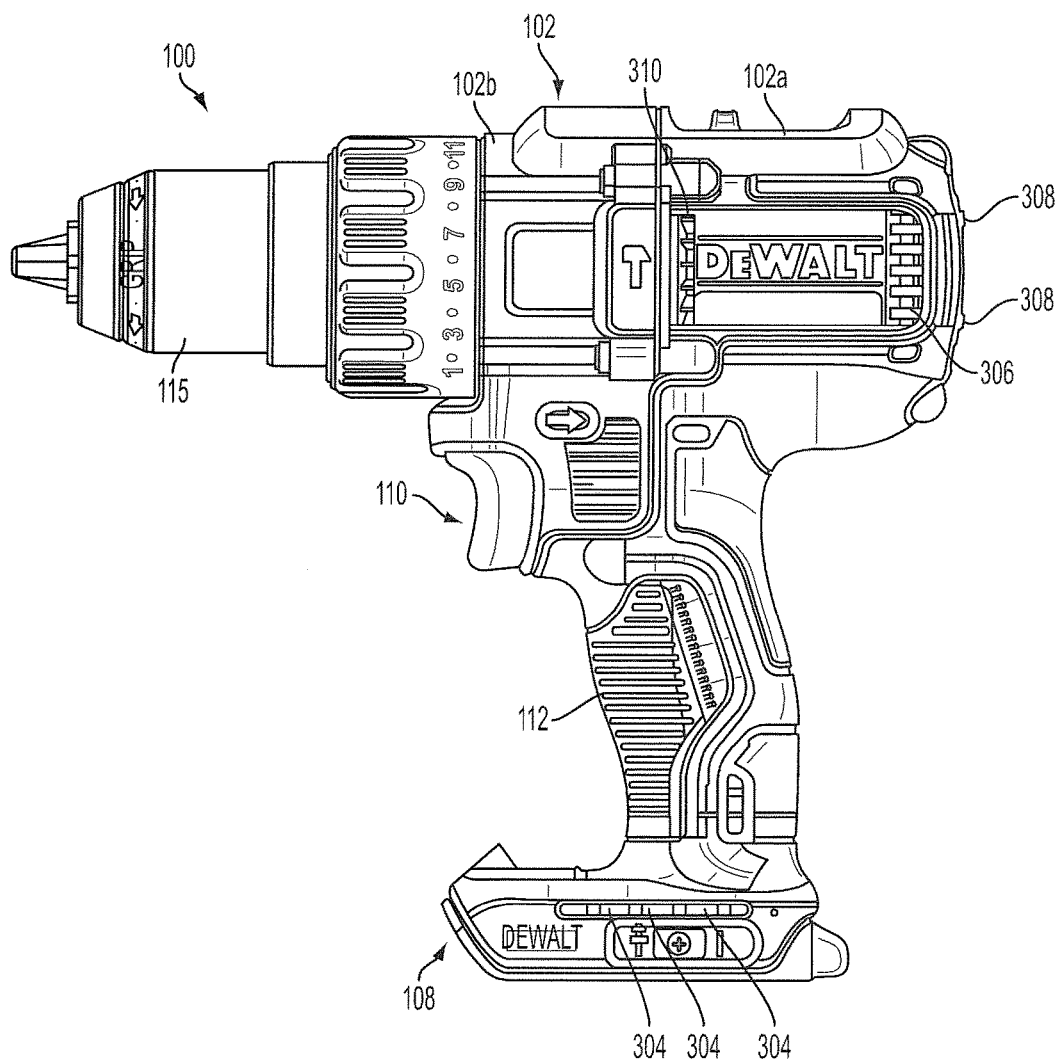
FIG. 1A is a side view of an embodiment of a power tool.
Figure 1B:
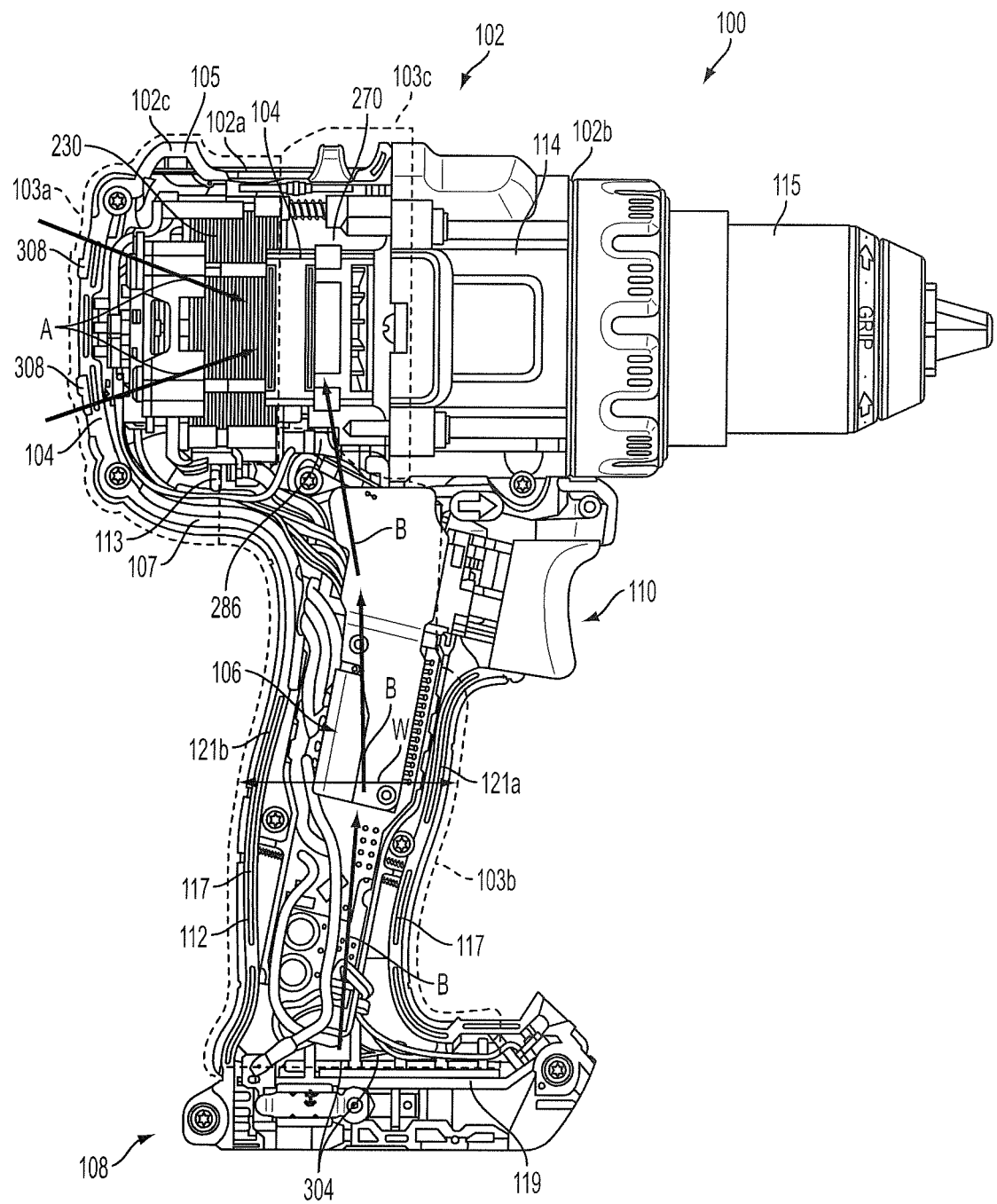
FIG. 1B is an opposite side view of the power tool of FIG. 1 with a portion of the housing removed.
Figure 1C:
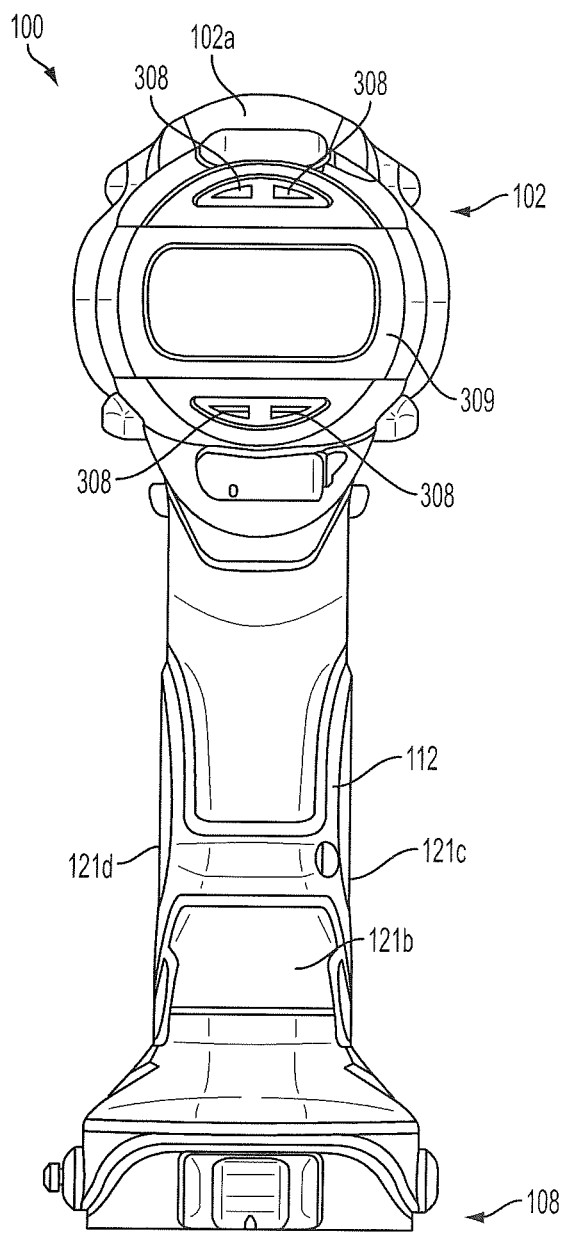
FIG. 1C is a rear view of the power tool of FIG. 1.

With reference to the FIGS. 1A-1C, a power tool 100 constructed in accordance with the teachings of the present disclosure is illustrated in a longitudinal cross-section view. The power tool 100 in the particular example provided may be a drill/driver, but it will be appreciated that the teachings of this disclosure is merely exemplary and the power tool of this invention could be a circular saw, a reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a housing 102, a motor 104, a control module 106, a battery pack receptacle 108, an input unit (e.g., a variable speed trigger) 110, a transmission 114, an output spindle (not shown), and a chuck 115 that can be coupled for rotation with the output spindle, according to an embodiment. In an embodiment, the housing 102 may include a motor housing 102a that houses the motor 104 and a gear case 102b that houses the transmission 114 and can be removably coupled to the motor housing 102a. In an embodiment, motor housing 102a is integrally formed with a handle 112 that houses the electronics control module 106.

According to an embodiment, the motor 104 may be any type of motor and may be powered by an appropriate power source (electricity, pneumatic power, hydraulic power). In the particular example provided, the motor 104 is a brushless DC electric motor and is powered by a battery pack inserted into the battery pack receptacle 108. The input unit 110 is mounted in the handle 112 below the motor housing 102a. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110 as described further below, may include a micro-controller for controlling the commutation of the motor 104, as well as power components for supplying power to the motor 104. In the exemplary embodiment of the invention, the control unit 106 is housed within the handle 112.

In an embodiment, power tool 100 is powered by a suitable power source such as the battery pack. It is envisioned, however, that the present disclosures can be applied to a power tool with an AC power source, which may further include an AC-to-DC converter to power to motor. The electronics control module 106 is electrically connected to the input unit 110, to the motor 104, and to a power source to control delivery of power to the motor 104 according to a user input. For example, using the variable-speed input and other inputs from the input unit 110, control unit 106 controls the power components to regulate the amount of power supplied to the motor 104. The details of the operation of the electronics control module 106 are beyond the scope of this disclosure. However, the power components that control the supply of power to the motor are located on a printed circuit board within the control unit 106. These components generate a substantial amount of heat. Therefore, coupled to the electronics control module 106 is a heat sink 106 composed of a folded metal sheet or plate, as discussed in more detail below.

Figure 2A:
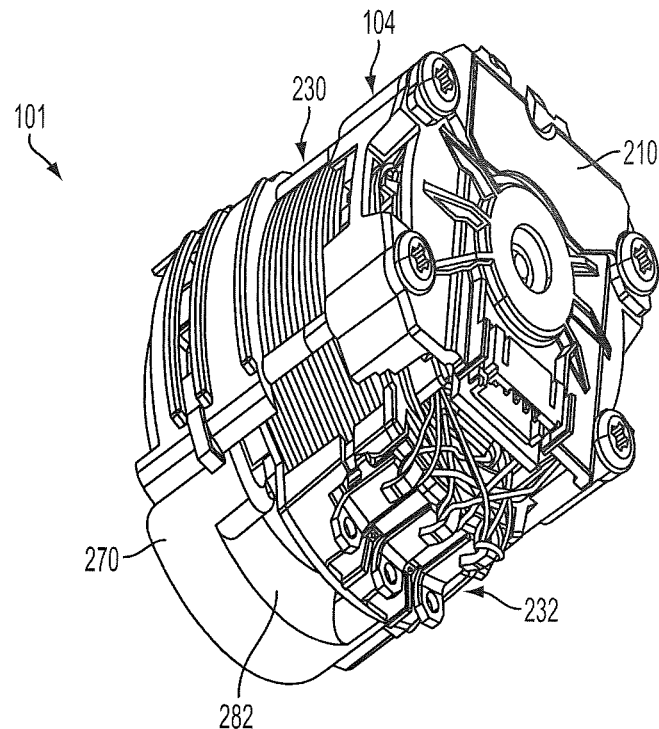
FIGS. 2A and 2B are perspective views of a motor assembly of the power tool of FIG. 1.
Figure 2B:
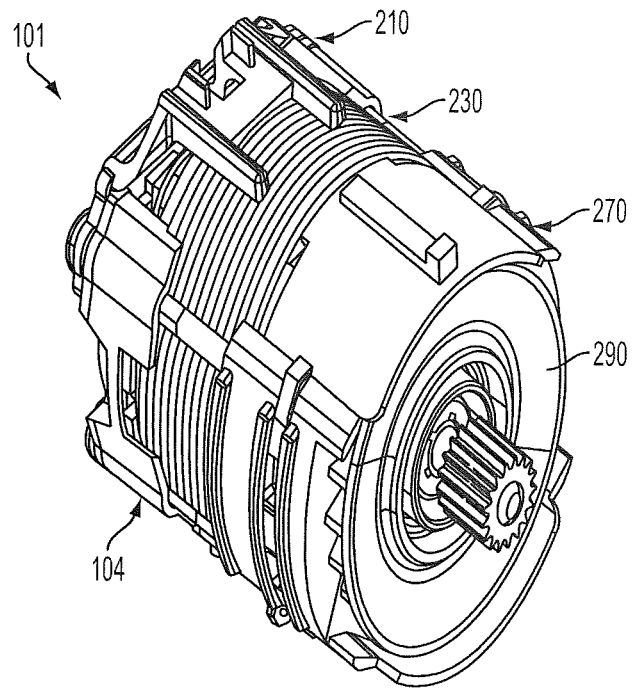
Figure 3A:
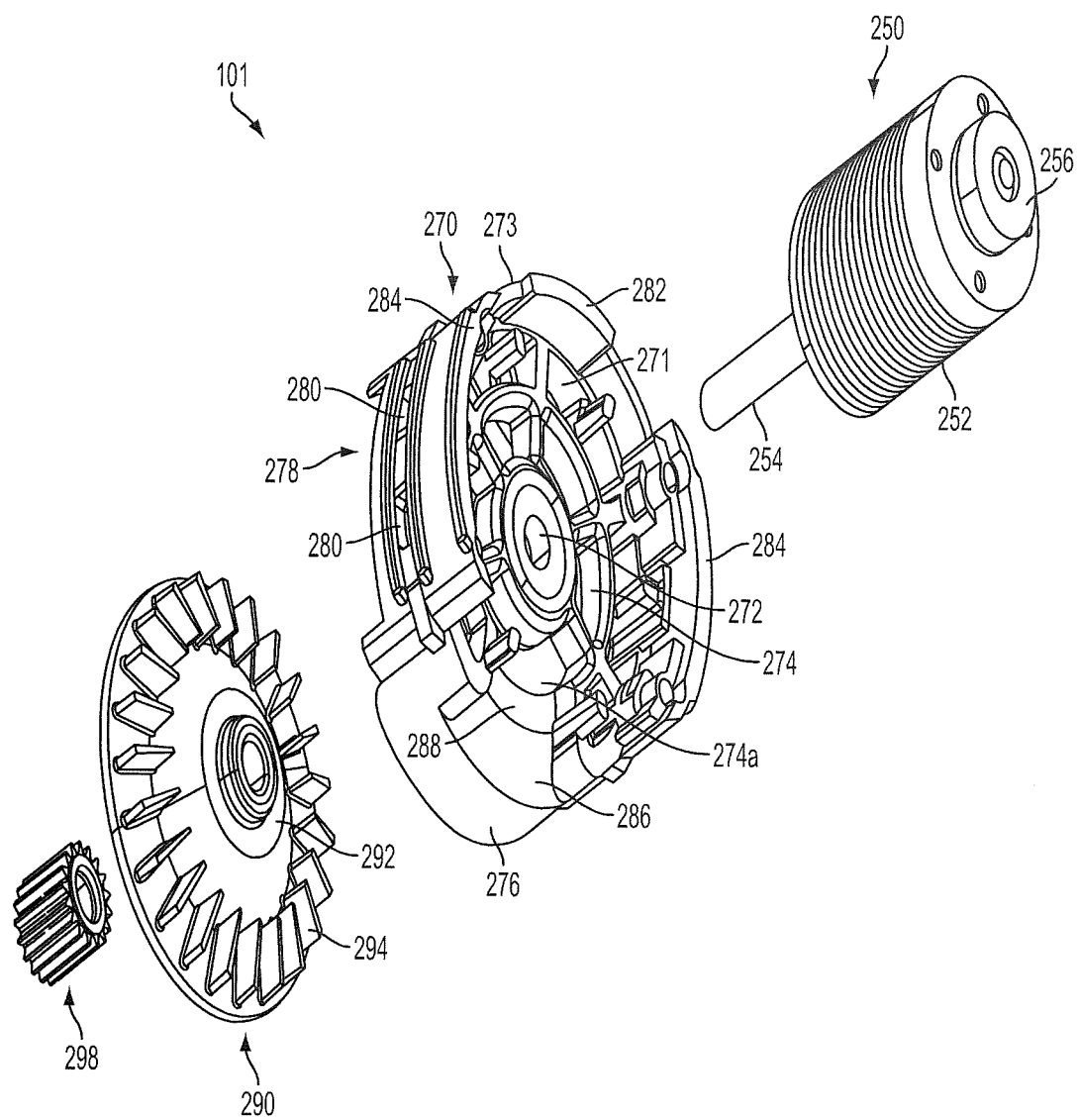
FIGS. 3A-3C are exploded perspective views of the motor assembly of FIGS. 2A and 2B.
Figure 3B:
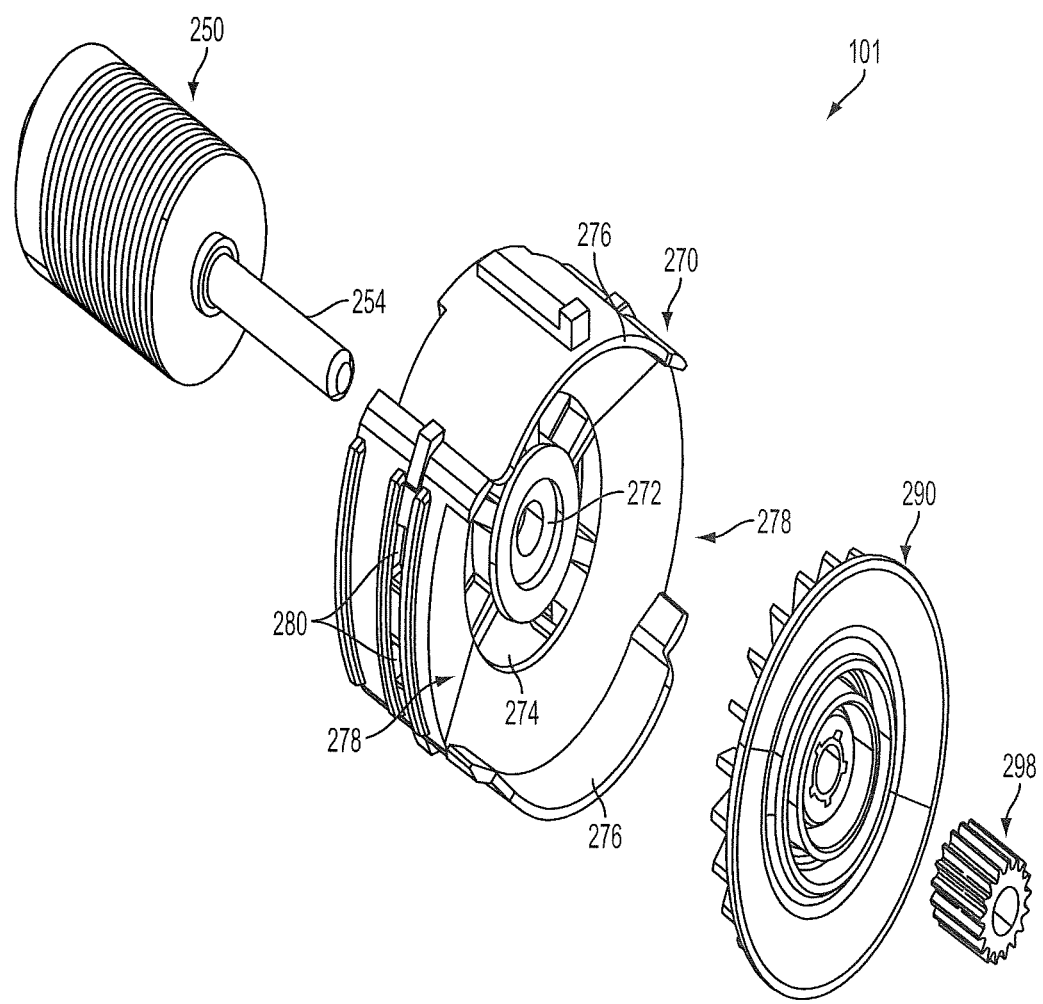
Figure 3C:
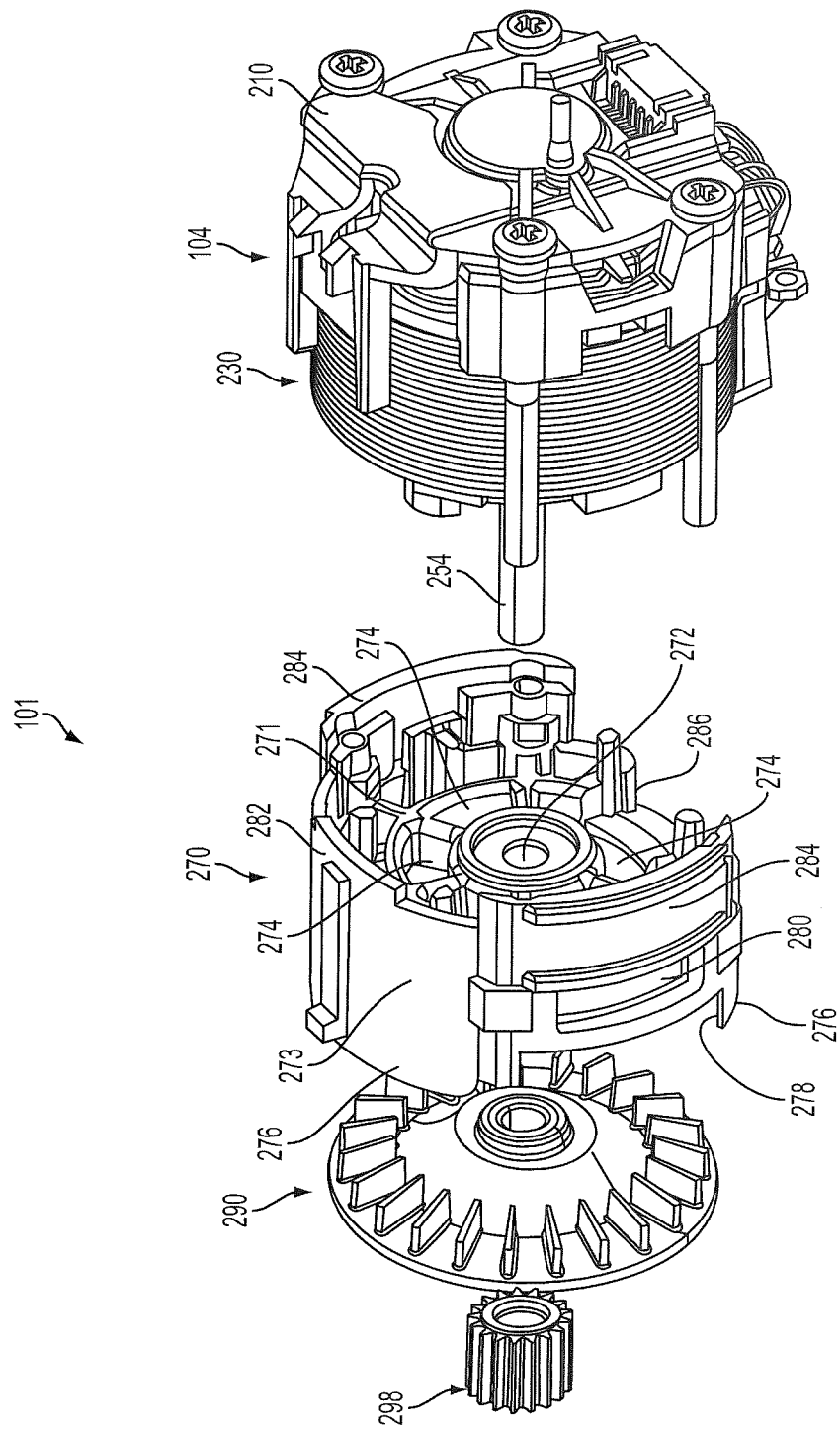

FIGS. 2A and 2B depicts perspective front and back views of a brushless motor assembly 101, according to an embodiment of the invention. FIGS. 3A-3C depict partial expanded views of the motor assembly 101, according to an embodiment. As shown in these figures, the motor assembly 101 includes the motor 104, a motor cap 270, a fan 290, and an output pinion 298. The motor 104 includes a hall board mount 210, a stator assembly 230, a rotor assembly 250. The motor cap 270 is coupled to a front end portion of the stator assembly 230 of the motor 104. The motor 104 is powered via terminals 232. Details of the hall board mount 210 and stator assembly 230, including the stator windings, are covered in International Patent Publication No. WO2011/159674 filed on Jun. 11, 2011, which is incorporated herein by reference in its entirety. Other features of the rotor assembly 230 and the motor cap 270 are discussed herein.

According to an embodiment, the rotor assembly 250 includes a rotor lamination stack 252 and a rotor shaft 254. The rotor lamination stack 252, in this embodiment, contains permanent magnets embedded inside. One side of rotor shaft 254 is secured to a rotor bearing 256, which is received inside a bearing receiving portion of the Hall board mount 210. The opposite side of the shaft is secured via a bushing inside a hole 272 of the motor cap 270. A fan 290 is secured to the shaft 254 on the opposite side of the end cap 270, i.e., with the motor cap 270 between the fan 290 and the rotor lamination 250. The fan 290 may be secured to the shaft 254 via, for example, press fitting. The pinion 298, which drives the tool transmission 114, is also secured to the shaft 254 via, for example, press fitting.

According to an embodiment, the motor cap 270 is generally cylindrical includes a radial wall 271 extending generally radially outward from the motor output shaft 254 and a circumferential wall 273 extending generally axially parallel to the shaft 254. The radial wall 271 of the motor cap 270 includes multiple inlet slots 274 circumferentially arranged around the hole 272. As fan 290 spins with the rotor shaft 164, it generates air flow through and around the motor stator 230 and/or the rotor lamination 250. This air flow is directed through the inlet slots 274 towards the fan 290. The circumferential wall 273 of the motor cap 270 includes arcuate portions 282/284 that align with the stator assembly 230, in an embodiment. Arcuate portions 284 in this embodiment include extended portions that partially protrude over and cover the stator assembly 230 lamination stack. These arcuate portions 282 and 284 help keeps air flow directed over or through the motor 104 towards the fan 290.

According to an embodiment, a radial air inlet 286 is provided in the circumferential wall 273 between arcuate portions 284 opposite arcuate portions 282. Radial air inlet 286 directs air from the tool handle 112 into the motor cap 270, and then through at least one inlet slot 274a of the inlet slots 274. In an embodiment, the inlet slot 274a is larger than the other slots inlet 274. In an embodiment, the outer wall of slot 274a includes a lateral recess 288 therein in the path of air flow from air inlet 286 to allow for lateral flow of air from air inlet 286 into the inlet slot 274a.

According to an embodiment, the middle portion 292 of the fan 290 is contoured towards the hole 272 of the motor cap 270. The back side 273 of the end wall 271 of the motor cap 270 is similarly contoured to follow the profile of the fan cap 290. According to an embodiment, the circumferential portion of the motor cap 270 includes two extended arcuate portions 276 that partially encapsulate a portion of circumference of the fan 290. Between the two extended arcuate portions 276 are side openings 278, which are aligned with air outlets in the tool housing, as will be discussed later, according to an embodiment. The fan 290 generates airflow through the motor stator 203/rotor lamination 250 and from air inlet 286, which go through the inlet slots 274 into the fan 290. In an embodiment, the back side of the main portion of the motor cap 270 acts as a baffle that helps the fan 290 to redirect the air flow out of the side openings 278 and corresponding tool housing air outlets. The motor cap 270 further includes recesses 280, which align with corresponding pins or projections in the tool housing for proper alignment purposes, according to an embodiment.

Figure 4:
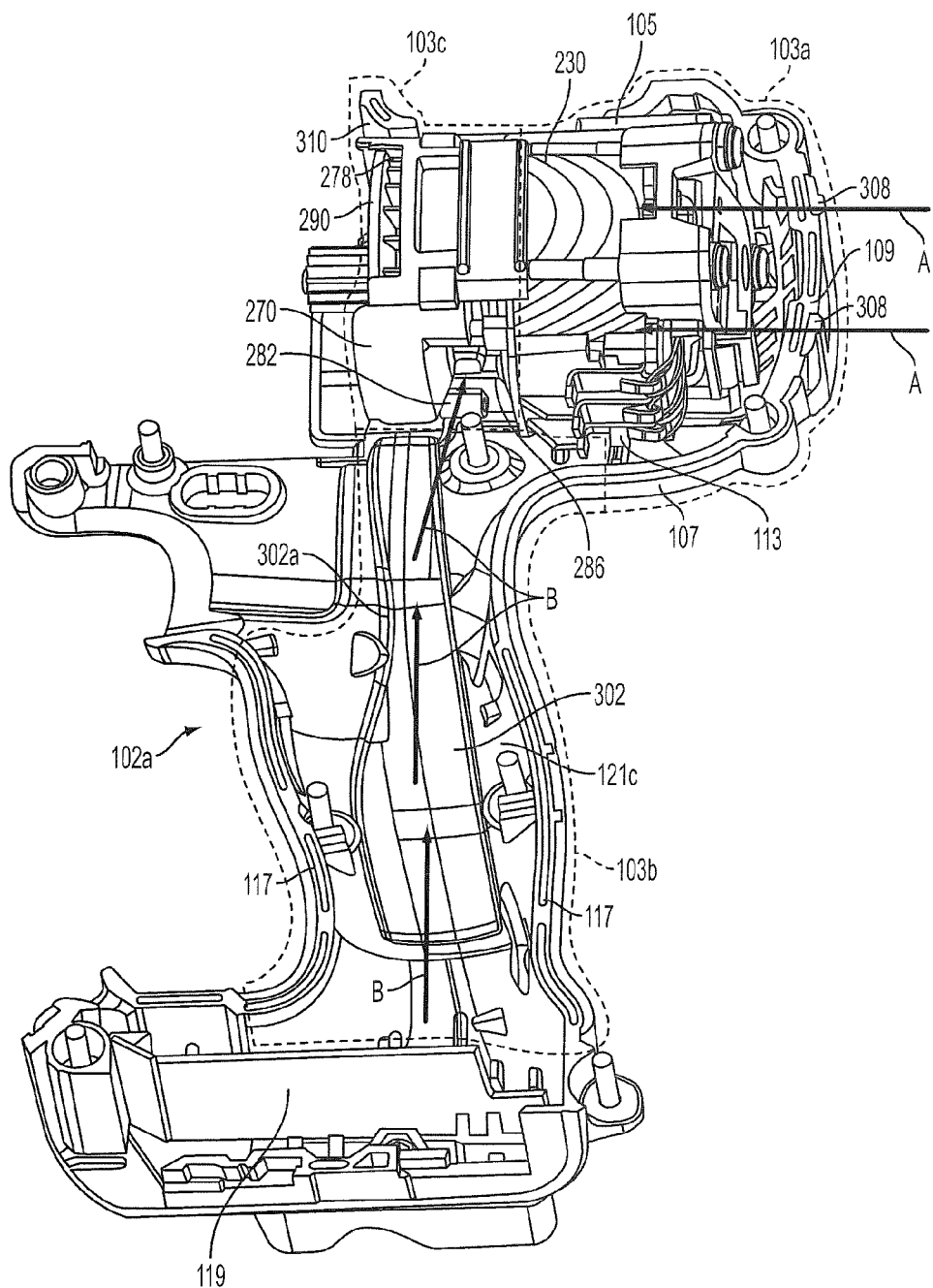
FIG. 4 is a side view of the power tool of FIG. 1 with a portion of the housing and the electronics control module removed.
Figure 5:
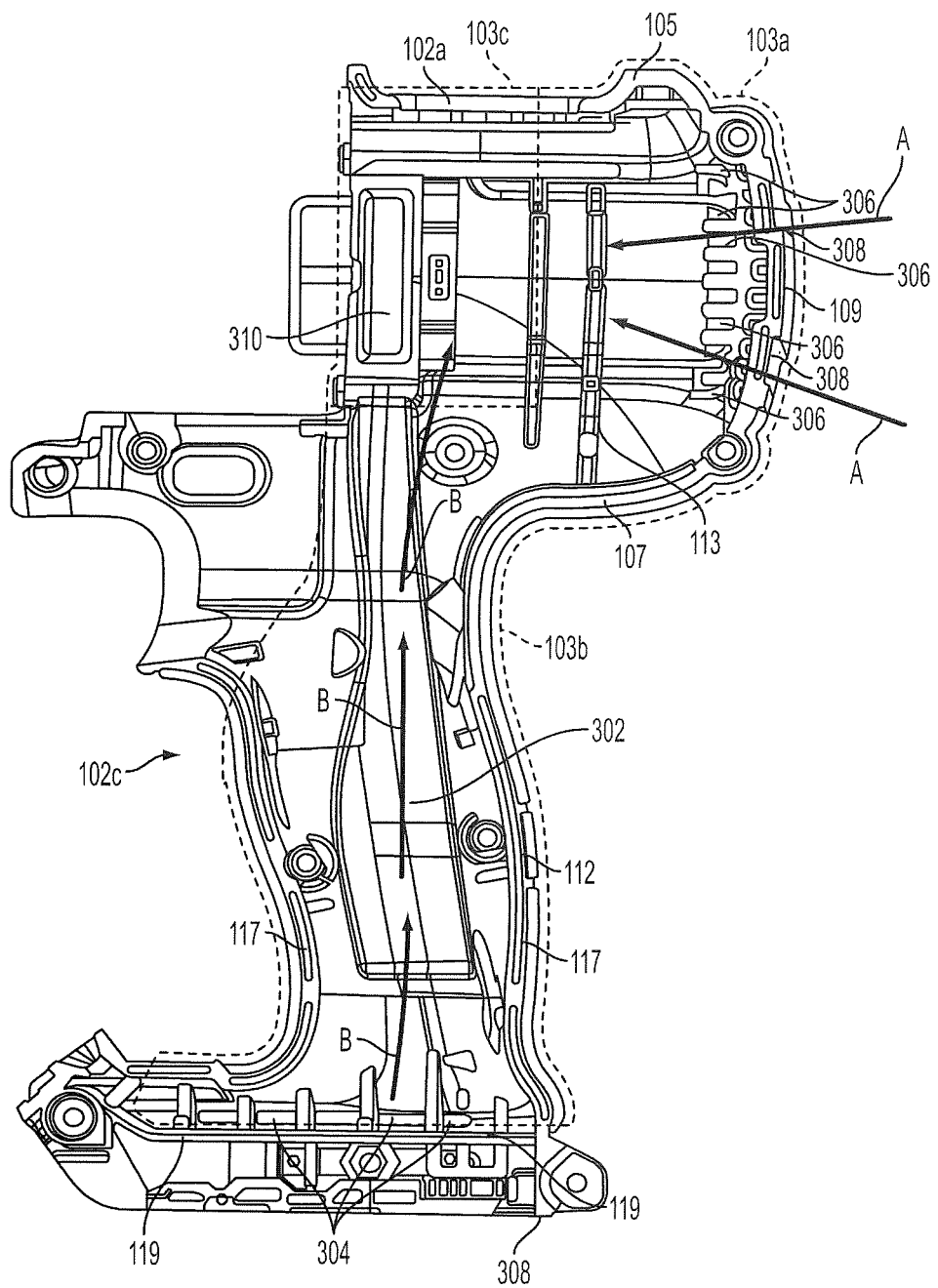
FIG. 5 is a side view of the power tool of FIG. 1 with a portion of the housing, the electronics control module, and the motor assembly removed.

Turning now to FIGS. 1B, 4 and 5, a tool housing half 102c is depicted with and without the electronics module 106, the motor 104 and the cap 270 therein. The motor housing 102a defines a first air chamber 103a, a second air chamber 103b, and a third air chamber 103c. The first air chamber 103a is generally bounded by a top wall 105, a bottom wall 107, a rear end cap 109, and an internal wall 113 of the motor housing 102a, and a front end 111 of the motor 104. A first set of air inlets 308 is defined in the rear end cap 109 (see also FIG. 1C). The first air chamber 103a receives the stator 230 and rotor 250 of the motor 104.

The second air chamber 103b is generally bounded by the outer wall 117 of the handle 102c, the internal wall 113 of the motor housing 102a, the motor cap 270, and a top wall 119 of the battery receptacle 308. A second set of air inlets 304 is disposed near the battery receptacle 308 and away from the motor 104. The second air chamber 103b receives the electronics control module 106.

The third air chamber 103c is generally bounded by the top wall 105 of the motor housing 102a and the exterior of the motor cap 270. The top wall 105 of the third chamber 103c defines an air outlet 310 (see also FIG. 1A). The third air chamber 103c receives the motor cap 270 and the fan 290. The motor cap 270 defines the air inlets 274 in the radial wall of the motor cap 270, which are in communication with the first air chamber 103a and the motor 104. The motor cap 270 also defines the radial air inlet 286 in the circumferential wall of the motor cap 270, which is in communication with the second air chamber 103b. Finally, the motor cap 270 defines the air outlet 287, which is adjacent to the fan 278 and in communication with the air outlet 310 in the motor housing 102a.

In operation, the fan 290 is driven by the motor to pull a first ambient airstream along arrows A through the first air chamber 103a from the air inlets 308, over the motor 104 to cool the motor 104, and through the first air inlet 285 into the motor cap 270, bypassing the second air chamber 103b. The fan 290 simultaneously pulls a second ambient airstream along arrows B through the second air chamber 103b from the air inlets 304, over the electronics module 106 to cool the electronics module 106, and through the second air inlet 286 into the motor cap 270, bypassing the first air chamber 103a. The fan 290 exhausts the first ambient airstream A and the second ambient airstream B out of the air outlet out of the power tool via the air outlets 287 and 310 along arrow C.

Because the first airstream A bypasses the second air chamber 103b, and the second airstream B bypasses the first air chamber 103a, both the motor 104 and the electronics module 106 are cooled by ambient air, rather than being cooled by warmer air that has already been passed over the other of the electronics module and the motor. This leads to more effective and efficient cooling of both the motor 104 and the electronics module 106.

In an embodiment, cooling of the motor 104 in the first air chamber 103a may be further enhanced by additional inlet air vents 306 provided around a radial end of the motor, e.g., near a circumferential portion of the hall board mount 210. The air from air inlet vents 306 and 308 flows through the motor components, including the stator assembly 230 and the rotor 250, and is directed into the motor cap 270 by the fan 290.

In an embodiment, cooling of the electronics module 106 in the second air chamber 103b is further enhanced by a converging air channel 302 formed during the tool housing molding process in the housing half 102c. The air channel 302 helps direct air from air inlet vents 304 arranged at the foot of the tool housing 102, to the motor cap 270 air inlet 286 discussed above. Air channel 302 is aligned above the control unit 106 to cool the control unit 106, preferably above a heat sink attached to and in parallel with the control unit 106 printed circuit board (PCB) in close proximity to the power components. Air channel 302 includes a converging nozzle-shaped portion 302a, wherein the width of the air channel 302 decreases, causing an increase in air flow velocity as it is directed towards the air inlet 286. Air channel 302 may be, for example, 0.5 to 2 mm deep as measured from the inner surface of the air channel to the edge of the inner surface of the housing half, according to an embodiment. In an embodiment, the width of the channel (i.e., distance between two walls of the air channel extending longitudinally along the axis of the handle and the control unit 106) may decrease from 15-25 mm at a lower portion of the channel 302, to 5-15 mm in the converging nozzle-shaped portion 302a. In an embodiment, the plane of the inner surface of the air channel is substantially parallel to the control unit 106, particularly the heat sink and the PCB. Although air channel 302 is shown in only one housing half 102a, it must be understood that the other housing half may similarly be provided with an air channel.

Figure 6:
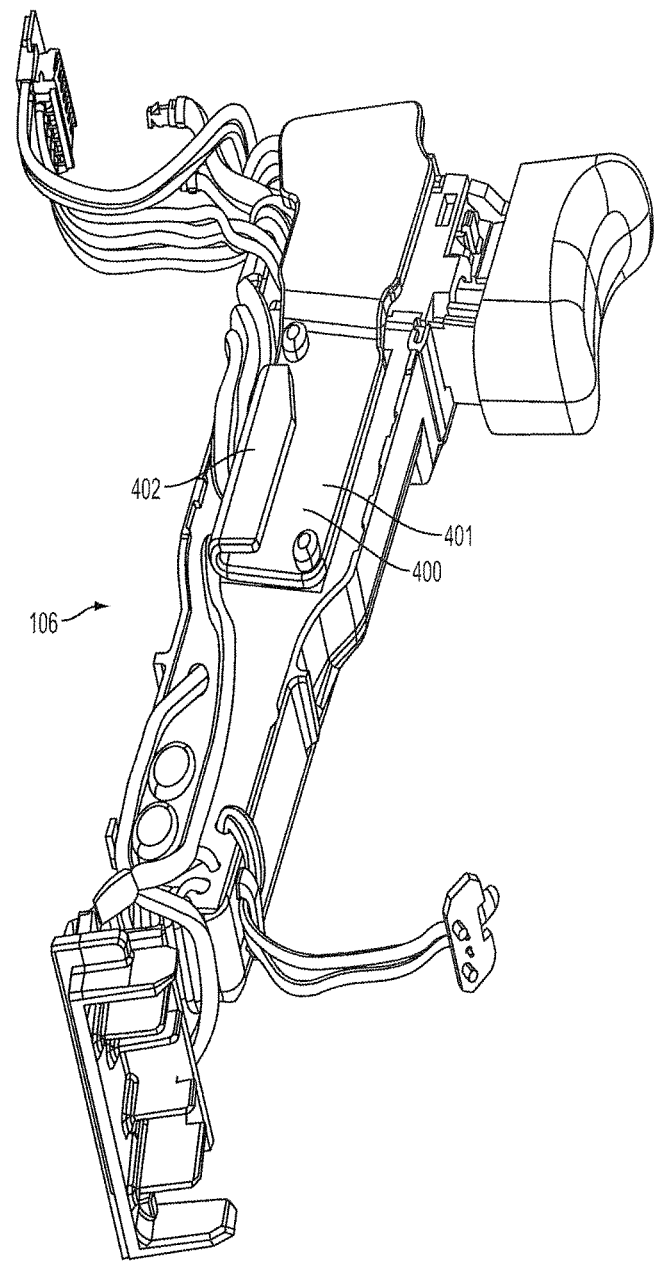
FIG. 6 is a perspective view of the electronics control module of the power tool of FIG. 1.
Figure 7:
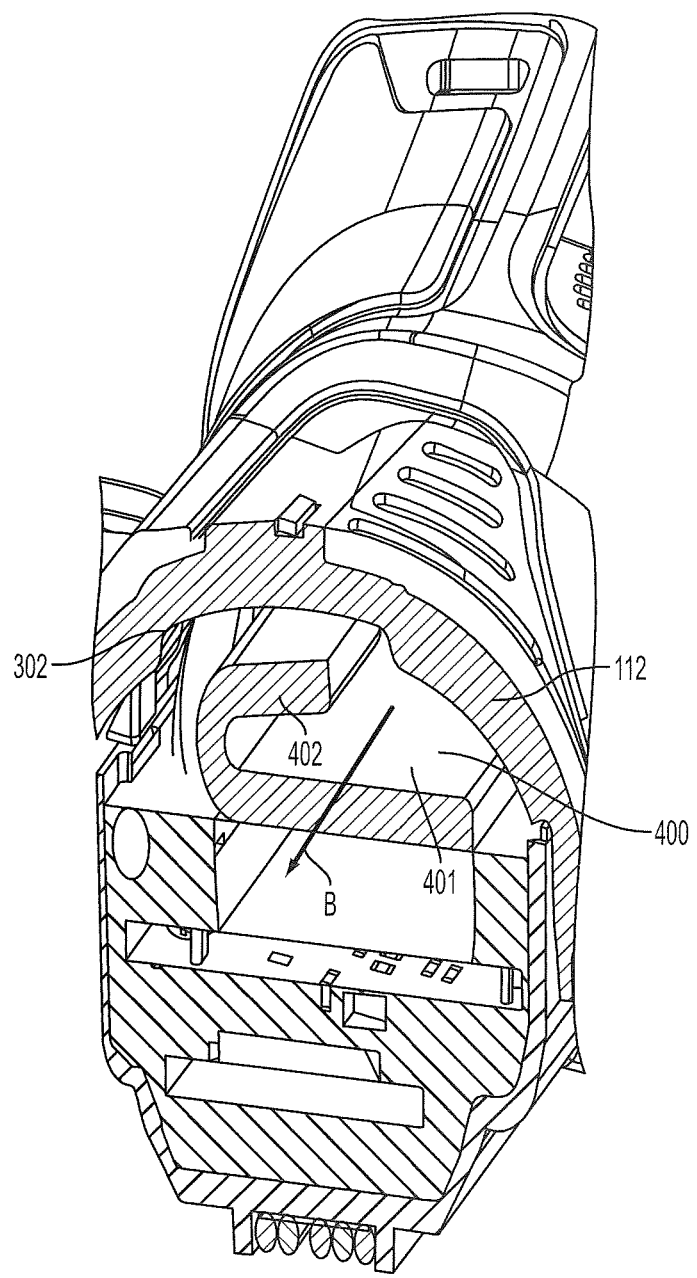
FIG. 7 is a perspective cross-sectional view of the handle of the power tool of FIG. 1.

In a further embodiment, cooling of the electronics module 106 may be further enhanced by the configuration of a heat sink 400. Referring to FIG. 6, the electronics control module 106 is provided with a heat sink 400 in close proximity to the power components and the air channel 302. The heat sink 400, in an embodiment, includes a main portion 401, which is arranged in contact with the control unit 106, and a folded portion 402, which protrudes from the main portion 401 and is folded to extend over a portion of the main portion 401 at a distance and parallel thereto. Both surfaces of the folded portion 402 are exposed to air flow, which substantially increases the overall surface area of the heat sink 400 that is exposed to air flow B. Further, as shown in FIG. 7, according to an embodiment, the folded portion 402 is arranged to partially penetrate into the air channel 302, particularly inside the converging nozzle-shaped portion 302a where there is more air flow. This arrangement substantially improves heat dissipation from the control unit 106, including the power components.

Referring to FIGS. 1B, 1C, and 4, it should be noted that the handle has a front portion 121a facing a front end of the power tool, a rear portion 121b facing a rear end of the power tool, and two lateral side portions 121c, 121d joining the front portion 121a and the rear portion 121b. The converging channel 302 is formed only in one of the lateral side portions 121c of the handle 112. Because the heat sink 400 is received in only one of the lateral side portions 121c, and not in the front or rear portions 121a, 121b of the handle 112, the handle 112 can be constructed to have a narrower width dimension W (see FIG. 1B), which enhances the ergonomics of the handle 112.

Figure 8:
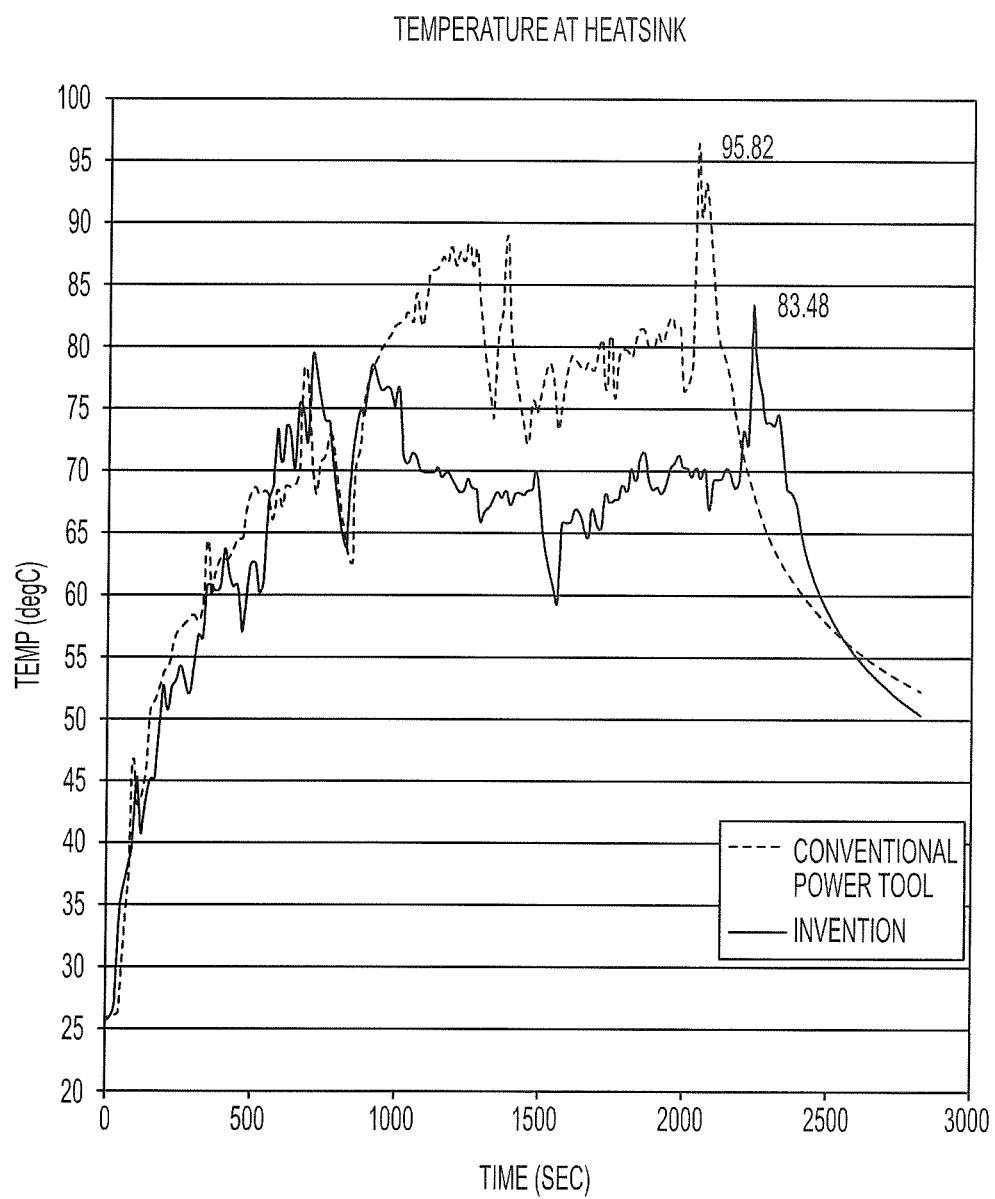
FIGS. 8-10 are graphs showing temperature measurements at various tool locations over time.
Figure 9:
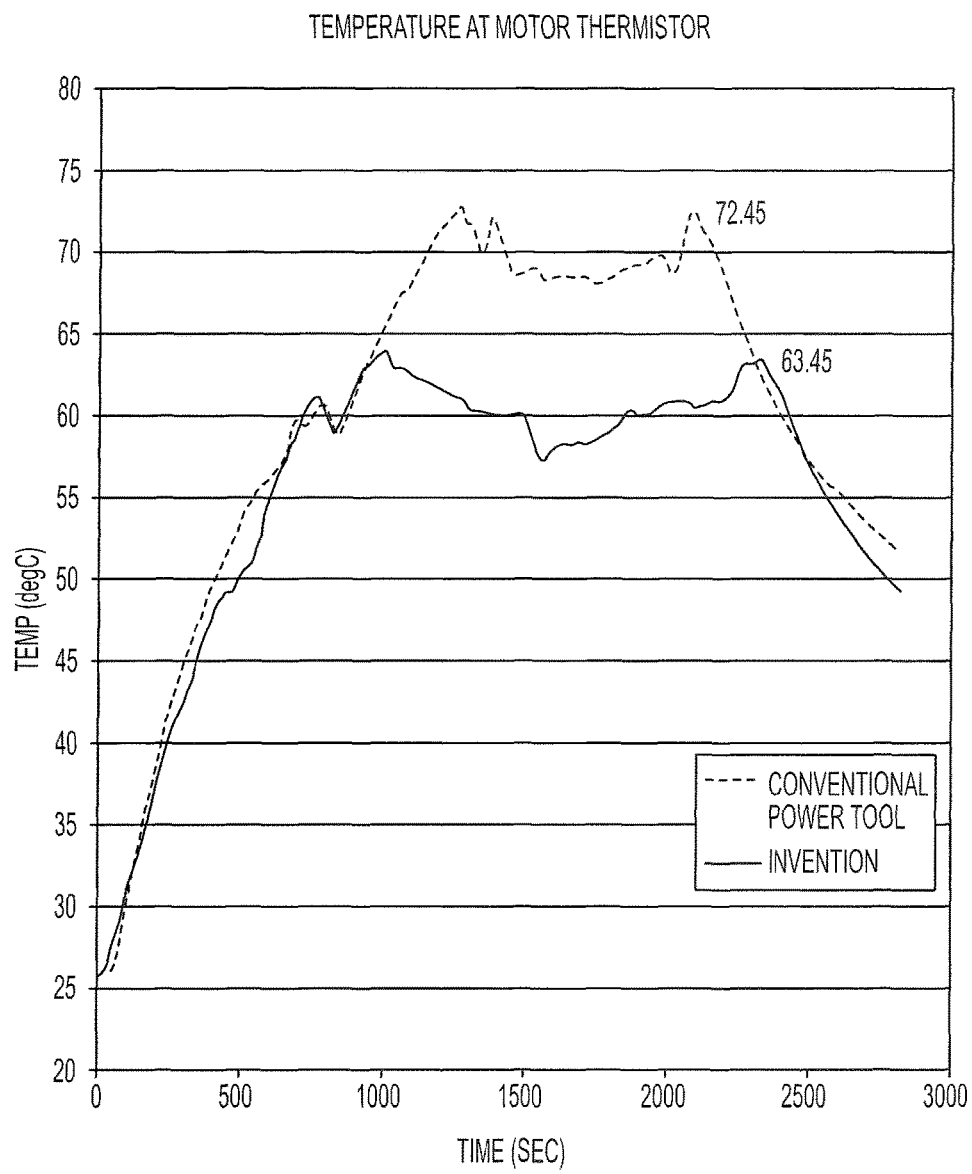
Figure 10:
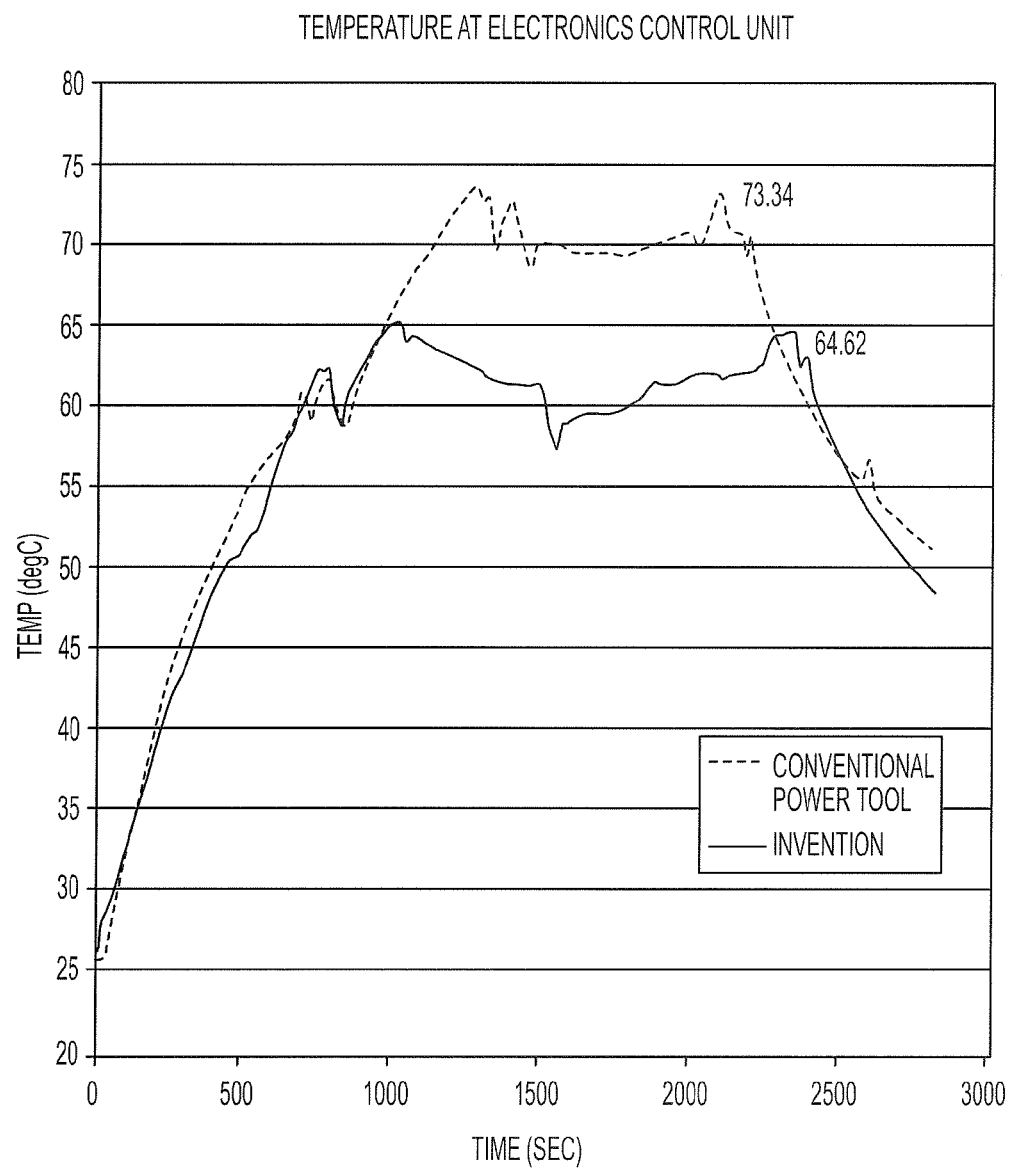

FIGS. 8-10 are graphs illustrating heat measurements of a power tool having the isolated first and second air chambers, the converging nozzle air channel 302, and the folded heat sink, as compared to a conventional power tool. In an exemplary embodiment, motor air intake from air inlets 306 and 308 in the first air chamber 103a is approximately 3.0 scfm (standard cubic feet per minute), compared to motor air intake of 2.6 scfm in a conventional power tool without similarly situated air vents 306 and 308. Additionally, air intake from air inlets 304 in the second air chamber 103b is approximately 1.1 scfm, compared to very low and negligible air intake in a conventional power tool without separated air chambers, similarly situated air inlets, a folded heat sink, and a converging air channel. The air inlet and motor cap design allows for optimization of the amount of air flow through the handle into the motor fan without sacrificing too much air flow through the motor. As shown in FIG. 8, temperature measurement at the heat sink show temperature reduction of 5 to 20 degrees Celsius in this embodiment compared to the conventional power tool after approximately 1000 seconds of use. Also, as shown in FIGS. 9 and 10, temperature measurements at the motor thermistor and the control unit show temperature reduction of approximately 10 degrees Celsius in this embodiment compared to the conventional power tool after approximately 1000 seconds of use. It is noted that these temperature measurements for the power tool according to this embodiment was taken at 23300 rpm, whereas the temperature measurements for the conventional motor was taken at a lower speed of 22400 rpm.

Figure 11A:
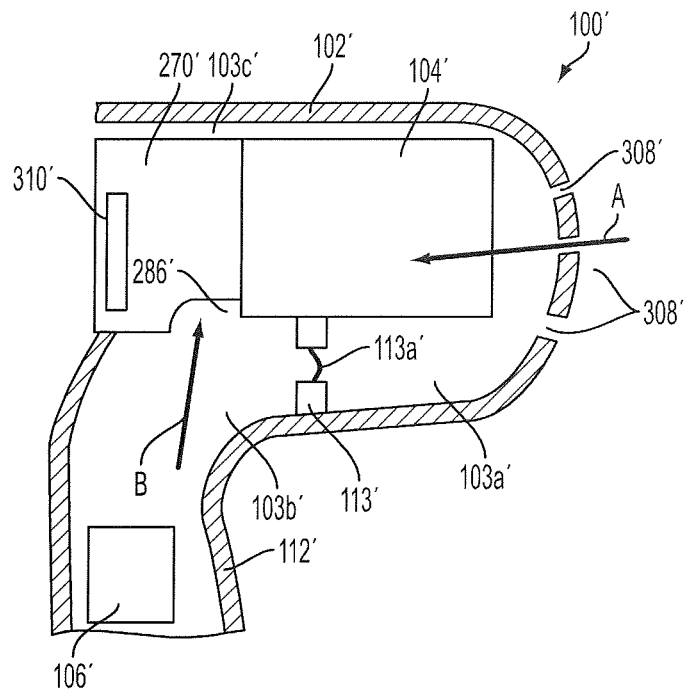
FIGS. 11A and 11B are side views of a portion of an alternative embodiment of a power tool.
Figure 11B:
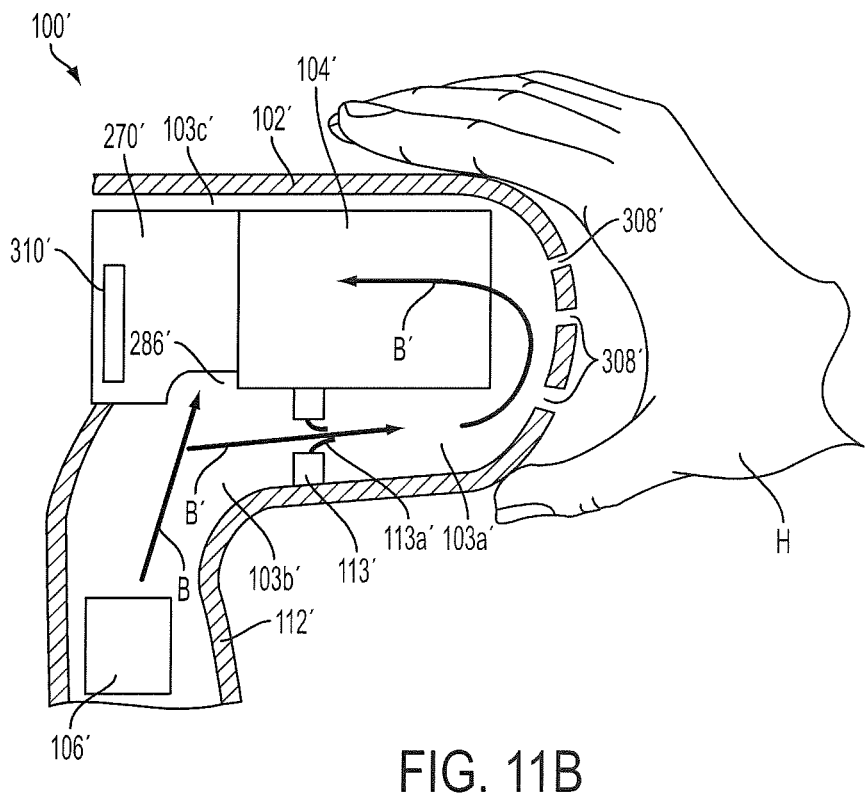

Referring to FIGS. 11A-11B, in an alternative embodiment, a power tool 100' has a motor housing 102' that contains a motor 104' and a motor cap 270', and a handle 112' that contains an electronics control module 106', which are similar to the analogously numbered components of the power tool 100 of FIGS. 1-7. The motor 104' is received in a first air chamber 103a' with first air inlets 308', similar to first air chamber 103a of FIGS. 1-7. The electronics control module 106' is received in a second air chamber 103b' with second air inlets (not shown), similar to the second air chamber 103b of FIGS. 1-7. The motor cap 270' is received in a third air chamber 103c' with air outlets 310', similar to the third air chamber 103c of FIGS. 1-7. An internal wall 113' separates the first air chamber 103a' from the second air chamber 103b'.

The power tool 100' of FIGS. 11A-11B differs from the power tool 100 of FIGS. 1-7 in that the internal wall 113' is formed with a one way valve 113a'. The valve 113a' allows air to flow from the second air chamber 103b' to the first air chamber 103a' when the pressure in the second air chamber 103b' exceeds the pressure in the first air chamber 103a' by a predetermined amount. The reason for the valve 113a' is that it has been discovered that some users tend to cover the air inlets 308' in the first air chamber 103a' with a hand H during operation (as shown in FIG. 11B). If the first and second air chambers 103a', 103b' remain isolated by the wall 113', this could lead to less effective cooling of the motor 104' as air may be prevented from flowing over the motor. To accommodate this situation, if a user's hand H covers the air inlets 308', the air pressure in first air chamber 103a' drops, and the valve 113a' opens (as shown in FIG. 11B) allowing air to flow across the motor.

As shown in FIG. 11A, during normal operation, the valve 113a' remains closed. The fan pulls a first ambient airstream A through the inlets 308', through the first air chamber 103a', across the motor 104', and into the motor cap 270', bypassing the second air chamber 103b'. The fan simultaneously pulls a second ambient airstream B through the second air chamber 103b', across the electronics control module 106', and into a radial inlet 286' of the motor cap 270', bypassing the first air chamber 103a'.

As shown in FIG. 11B, if a users' hand H covers some or all of the air inlets 308' in the first air chamber, this will cause a pressure drop in the first air chamber 103a' since there is little or no ambient airstream A that is flowing through the air inlets 308' into the first air chamber 103a'. Meanwhile, the fan continues to pull the second ambient airstream B through the second air chamber 103b' and into the radial opening 286' of the motor cap 270' to cool the electronics. Due to the pressure differential between the first and second air chambers, the one way valve 113a' opens. This allows a portion of the airstream B, labeled as B', to flow through the first air chamber 103a' and across the motor 104' to cool the motor 104'. This type of motor cooling may be less effective than cooling the motor with the separate ambient airstream A, as described above, because the airstream B' has already been preheated by the electronics control module 106'. However, it could be sufficient to avoid overheating of the motor 104 if the user covers the air inlets 308'.

The one way valve 113a' may be any type of suitable fluid valve such as a check valve, a diaphragm valve, a flapper, a ball valve, a swing valve a tilting disc valve, a stop check valve, a lift valve, or a duckbill valve. It should be understood that the one way valve may be replaced by a two way valve or a reversed one way valve to allow air to flow from the first air chamber 103a' to the second air chamber 103b' upon a pressure drop in the second air chamber 103b'.

The description of the disclosure is merely exemplary in nature and, thus, variations that do not depart from the gist of the disclosure are intended to be within the scope of the disclosure. Such variations are not to be regarded as a departure from the scope of the disclosure, and are within the scope of the following claims.

What is claimed is:

1. A power tool comprising:
 a housing having a first housing portion defining a first air chamber and a first air inlet, a second housing portion defining a second air chamber and a second air inlet, and a third housing portion defining a third air chamber and an air outlet;
 a motor disposed in the first housing portion;
 an electronics module disposed in the second housing portion and electrically connected to the motor;
 a fan disposed in the third housing portion, the fan driven by the motor, wherein the fan: (a) pulls a first ambient airstream through the first air chamber from the first air inlet and into the third air chamber, bypassing the second air chamber, to cool the motor, (b) pulls a second ambient airstream through the second air chamber from the second air inlet and into the third air chamber, bypassing the first air chamber, to cool the electronics module, and (c) exhausts the first ambient airstream and the second ambient airstream from the third air chamber via the air outlet; and
 a motor cap secured to a front end of the motor, the motor cap including a generally radial wall disposed between the fan and the motor and defining a first cap inlet in communication with the first air chamber to direct first ambient airstream to the fan, and a generally-cylindrical sidewall defining a second cap inlet in communication with the second air chamber to direct air to direct second ambient airstream to the fan.

2. The power tool of claim 1, wherein the first air chamber is at least partially defined by an outer wall of the first housing portion, and in internal wall separating the first air chamber from the second air chamber.

3. The power tool of claim 2, wherein the internal wall defines a valve that opens when pressure in the second air chamber exceeds pressure in the first air chamber by a predetermined threshold amount, to allow the fan to pull the second ambient airstream through the first air chamber into the third air chamber to cool the motor.

4. The power tool of claim 2, wherein the generally-cylindrical sidewall of the motor cap at least partially contains the fan.

5. The power tool of claim 1, wherein the first housing portion comprises a rear portion of a motor housing, the second housing portion comprises a handle extending transverse to the motor housing, and the third housing portion comprises a front portion of the motor housing.

6. The power tool of claim 5, further comprising an internal wall separating the first housing portion from the second housing portion.

7. The power tool of claim 5, wherein the second air chamber is at least partially defined by a converging channel formed in the handle that converges from a wider dimension adjacent the second air inlet and a narrower dimension adjacent the third air chamber.

8. The power tool of claim 7, wherein the handle has a front portion facing a front end of the power tool, a rear portion facing a rear end of the power tool, and two lateral side portions joining the front portion and the rear portion, the third air chamber at least partially defined by a converging channel formed only in one of the lateral side portions and receiving the heat sink.

9. The power tool of claim 5, wherein the electronics module is coupled to a heat sink received the second air chamber.

10. The power tool of claim 9, wherein the heat sink comprises a folded metal plate.

11. A power tool comprising:
 a motor housing defining a first air chamber with a first air inlet, and a third air chamber with an air outlet;
 a handle coupled to and extending from the motor housing, the handle defining a second air chamber with a second air inlet away from the motor housing;
 a motor disposed in the first air chamber;
 an electronics module disposed in the handle and electrically connected to the motor;
 a fan disposed in the third air chamber, the fan driven by the motor, wherein the fan: (a) pulls a first ambient airstream through the first air chamber from the first air inlet and into the third air chamber, bypassing the second air chamber, to cool the motor, (b) pulls a second ambient airstream through the second air chamber from the second air inlet and into the third air chamber, bypassing the first air chamber, to cool the electronics module, and (c) exhausts the first ambient airstream and the second ambient airstream from the third air chamber via the air outlet; and a motor cap secured to a front end of the motor, the motor cap including a generally radial wall disposed between the fan and the motor and defining a first cap inlet in communication with the first air chamber to direct first ambient airstream to the fan, and a generally-cylindrical sidewall defining a second cap inlet in communication with the second air chamber to direct air to direct second ambient airstream to the fan.

12. The power tool of claim 11, further comprising in internal wall separating the first air chamber from the second air chamber.

13. The power tool of claim 12, wherein the internal wall defines a valve that opens when pressure in the second air chamber exceeds pressure in the first air chamber by a predetermined threshold amount, to allow the fan to pull the second ambient airstream through the first air chamber into the third air chamber to cool the motor.

14. A power tool comprising:
a housing having a first housing portion and a second housing portion;
a motor disposed in the first housing portion and having a motor shaft;
an electronics module disposed in the second housing portion and electrically connected to the motor;
a fan mounted on the motor shaft and driven by the motor; and
a motor cap secured to a front end of the motor, the motor cap including a generally radial portion disposed between the fan and the motor and defining at least one axial air inlet that allows entry of a first ambient airstream from the first housing portion to the fan, and a generally-cylindrical portion defining a radial air inlet that allows entry of a second air chamber from the second housing portion to the fan bypassing the first housing portion.

15. The power tool of claim 14, wherein radial portion of the motor cap defines a hole for receiving the motor shaft therein, the motor shaft being secured inside the hole via a bushing.

16. The power tool of claim 14, wherein the at least one axial air inlet comprises a plurality of inlet slots circumferentially arranged around a center portion of the motor cap.

17. The power tool of claim 16, wherein radial air inlet is arranged to direct air through at least one of the plurality of inlet slots towards the fan.

18. The power tool of claim 14, wherein the generally-cylindrical portion of the motor cap comprises at least one axially-extending arcuate portion that produce over an outer portion of the motor.

* * * * *